May 17, 1960 C. C. WHITEHEAD 2,937,234

TELEVISION APPARATUS

Filed July 2, 1954 2 Sheets-Sheet 1

INVENTOR.
CYRIL C. WHITEHEAD

BY Raymond D Jenkins
ATTORNEY

May 17, 1960

C. C. WHITEHEAD 2,937,234

TELEVISION APPARATUS

Filed July 2, 1954

2 Sheets-Sheet 2

INVENTOR.
CYRIL C. WHITEHEAD
BY
Raymond W. Jenkins
ATTORNEY

United States Patent Office 2,937,234

Patented May 17, 1960

2,937,234

TELEVISION APPARATUS

Cyril Cryer Whitehead, London, England, assignor to Bailey Meter Company, Cleveland, Ohio, a corporation of Delaware Application July 2, 1954, Serial No. 441,110

Claims priority, application Great Britain July 3, 1953

1 Claim. (Cl. 178—7.1)

This invention relates to television apparatus of the kind employing at the picture transmitting end a flying spot scanner. Such apparatus usually includes a light sensitive cell arranged to receive light reflected from the whole of the surface or surfaces to be televised, and hitherto, in such apparatus, it has been necessary, unless the object to be televised, the scanner and the light-sensitive cell have been enclosed in a light-tight-housing, for excluding ambient lighting, to place the light-sensitive cell close to the object being televised in order to collect from the object as much of the light provided by the scanner as possible. Unless this was done, the percentage fluctuation in an output signal derived from the light sensitive cell was found to be too small for practical use. In some instances, as when the object is a gauge adapted to operate at high internal pressure and including a column of liquid the level of which is liable to fluctuation and is to be observed, light from an essential part of the object, which can only be viewed from one viewpoint or over a small viewing angle, cannot be reflected onto the light sensitive cell if that cell is to be mounted close to the object and mounted out of the beam from the flying spot scanner; and a further light-sensitive cell must be provided at the rear of the object to detect light transmitted through the object. Recourse to a light-tight enclosure is often very inconvenient or impractical, and the alternative, the use of a second cell mounted behind the object, is an undesirable complication which removes the assurance that the indication of, say, a water level shown on the associated television receiver is correct, since a fault developing in the second cell or its associated circuits will not affect the picture of the water level gauge seen on the receiver but may well show an incorrect water level in that gauge.

An object of the invention is the provision of television picture transmission apparatus of the flying spot scanner type capable of satisfactory operation even when the object to be televised is illuminated by an incandescent electric lamp. A further object is to enable the light-sensitive cell to be located in a position in which it may receive light returned from the rear of a narrow and deep slot or the like in the object being televised.

The invention includes television picture transmitting apparatus comprising a flying spot scanner adapted to scan an object to be televised with light having a wavelength in the region of 4000 angstrom units and a vacuum photo-emissive-cell type light-sensitive unit with a peak response to light having a wavelength in the region of 4000 angstrom units and arranged to be subject to light returned only or substantially only from the area of the object scanned by the scanner.

The invention also includes television picture transmitting apparatus comprising a flying spot scanner adapted to scan an object to be televised with substantially monochromatic light with a peak output in the region of 4000 angstrom units and a vacuum photo-emissive light-sensitive cell with a peak response to light having a wavelength in the region of 4000 angstrom units and arranged to be subject to light returned only or substantially only from the area of the object scanned by the scanner.

The invention will now be described, by way of example, with reference to the accompanying partly diagrammatic drawings, in which.

Figure 5:
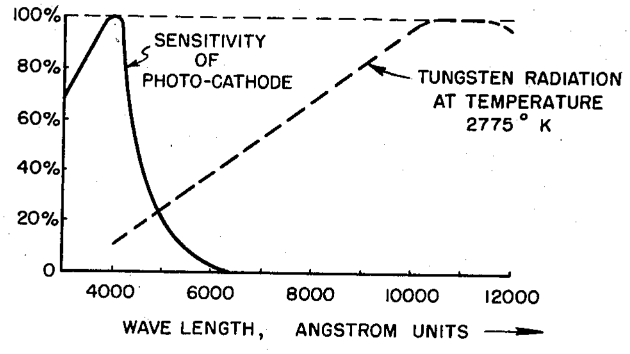

Figure 5 comprises a set of performance curves for a photo-electric cell and for a tungsten filament lamp.

Figures 1, 2:
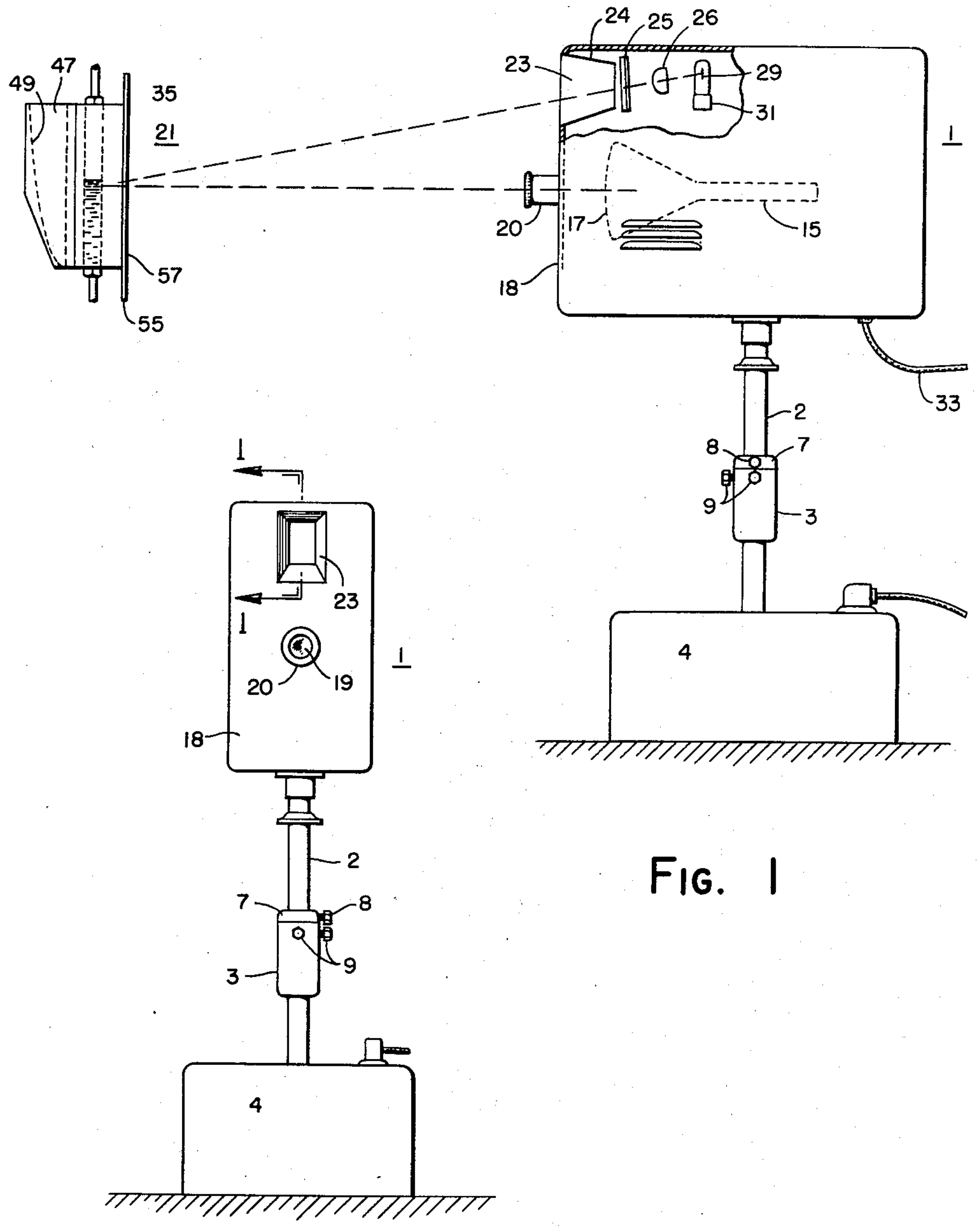
Figure 1 is a side elevation of a television picture transmitting apparatus and of an object being televised, partly in section on the line 1—1 of Figure 2.
Figure 2 is a front elevation of the television apparatus shown in Figure 1.

The television picture transmitting apparatus illustrated in Figures 1 and 2 is of the flying spot scanner type, in which a beam of light is caused to scan the object to be televised and the instantaneous intensity of the light emitted from the object is indicated by a photo-electric light-sensitive unit or cell which provides an electrical effect having a known relationship to the intensity of the light to which it is subjected.

Thus a camera unit 1 containing the scanner and the light-sensitive unit is mounted on an upright shaft 2 which extends partway into a column 3 secured to the top of a box-like base 4, which base contains a power unit for energising the camera unit and connected to the camera unit by an electric cable (not detailed) extending upwardly through the column 3 and the shaft 2. A ring 7, encircling the shaft 2 may be locked at a desired elevation thereon by a stud bolt 8 which extends radially through the ring, abuts against the top end of the column 3 and serves to maintain the camera unit 1 at a desired level above the base 4, and stud bolts 9 extending radially through an upper part of the column 3 enable the shaft 2 to be locked in a desired angular position relative to the base 4.

Housed in a lower part of the camera unit 1 is a cathode ray tube 15, the fluorescent screen 17 of which comprises the well-known phosphor designated Nickel-killed Zinc Sulphide, G.345. Associated with the tube 15 and located in the camera unit 1 are appropriate focussing coils, time base circuits and deflector coils whereby a vertical raster may be produced on the fluorescent screen of the tube. Opposite the screen 17, the front wall 18 of the camera unit is formed with an aperture 19 provided with an optical lens system 20 comprising a pair of double-convex lenses moulded from a suitable plastic material and so set relative to the screen that in operation an inverted and reversed image of the raster on the screen 17 will be produced on the object 21 to be televised.

The front wall 18 of the camera unit 1 is formed with a second aperture 23 positioned vertically above the aperture 19 and of vertically elongated rectangular shape, a glass dust excluding window being provided. Extending inwardly of the wall 18 and encircling the aperture 23 is a hood 24, the axis of which is upwardly and rearwardly inclined, the interior surface of which is of matt black finish and at the rearmost end of which is positioned a doublet lens system consisting of a pair of crossed cylindrical lenses 25 and 26 of which the lens 25, nearer the aperture 23, has its cylindrical axis vertical. If desired, one of these lenses may be replaced with a biconvex lens. The lens system serves to concentrate light entering the aperture 23 onto the photo-cathode 29 of a vacuum photo-emissive-cell type light-sensitive unit 31. This cell 31 is of a type having a peak response to incident light having a wave-length in the region of 4000 angstrom units and including a multi-stage (e.g. nine stage) electron multiplier, and several such cells are commercially available, for example the cell known as 931A (American) and the cells designated 27M1, 27M2 and 27M3 and sold under the registered trademark Ediswan (British).

Associated with the photo-electric cell 31 in well known manner are a source of high tension voltage located in the base 4, a potential divider system for maintaining the grids of the electron multiplier at suitable voltages and a load resistance across which is developed the output or signal voltage of the cell, these latter items being mounted in the camera unit 1. In the arrangement shown, this output signal voltage is transmitted from the camera unit through the cable 33 to a remote television picture receiving apparatus (not illustrated). The cable 33 also carries suitable "frame" and "line" signal pulses derived from the time base circuits associated with the cathode ray tube 15, to enable the receiving apparatus to function in synchronism with the tube 15 and so to resolve the output signal voltage from the cell 31 into a pictorial representation of the object 21 being televised.

Figure 4:
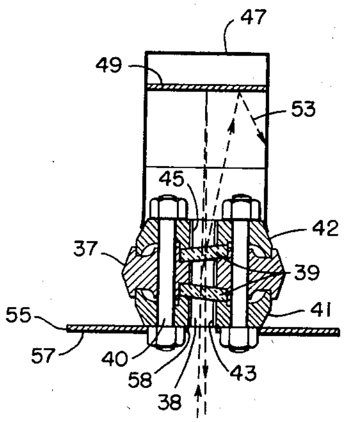
Figure 4 is a sectional plan view taken on the line 4—4 of Figure 3.
Figure 3:
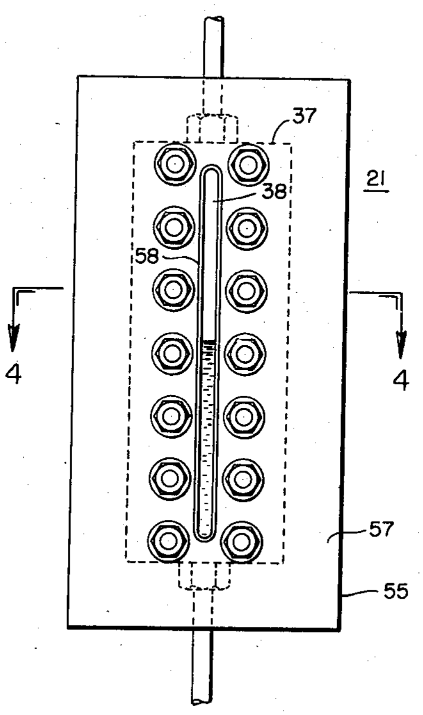
Figure 3 is an elevation of the object being televised, as viewed from the direction of the television apparatus shown in Figure 1.

The object 21 which is to be televised comprises a water level gauge 35 associated with the steam and water drum (not shown) of a water tube steam boiler. The actual gauge illustrated is of a well known type comprising a vertically elongated body part 37 formed with a longitudinally extending slot 38 in which are mounted two flat heat resisting transparent windows 39 arranged to lie nearer together at one side of the gauge than at the other side, the windows being clamped against shoulders formed in the body part 37 by nuts and bolts 40 engaging front and rear cover plates 41 and 42 respectively. The plates 41 and 42 are formed with slots 43 and 45 respectively, which slots are aligned with the slot 38. The water column to be observed is contained between the windows 39. Attached to the rear cover plate 42 is a light-tight box 47, the interior surface of which is of a matt black finish, which extends beyond the ends of the slot 38 and which contains a mirror 49 formed by a narrow strip of highly polished stainless steel which is curved, as viewed in sectional side elevation, in such a manner that light originating from the cathode ray tube 15 and passing through a part of the space between the windows 39 which contains steam will be reflected back through the slot 38 and enter the aperture 23 of the camera unit 1. Owing to the different coefficients of optical refraction of steam and water, light originating from the cathode ray tube 15 and passing through a part of the space between the windows 39 which contains water will be refracted sidewardly, as indicated in Figure 4 by the dotted line 53, so as to strike the matt black interior surface of the box 47, where it will be substantially completely absorbed.

Arranged in front of the front cover plate 41, and suitably secured thereto by spring clips (not detailed), is an aluminium sheet metal screen 55, the front face 57 of which is provided with a matt finish, and which is formed with a vertically elongated slot 58 aligned with the slot 38 but of slightly greater width. If desired, the screen may also bear a line indicating a desired normal water level in the gauge and/or lines indicating upper and lower safe operating limits for the water level.

During operation of the television picture transmitting apparatus described above, the camera unit 1 is adjusted both vertically and angularly relative to the base 4 and the lens system 20 is axially adjusted relative to the cathode ray tube 15 to produce an image of the raster on the fluorescent screen 17 of the tube 15 on screen 55 and on the parts of the water level gauge 35 which are immediately behind the slot 58 in the screen 55. Owing to the fact that the phosphor used for the screen 17 emits a substantially monochromatic light which has a peak value in the region of 4000 angstrom units and which thus includes only light having wave-lengths which fall within a narrow spectral band, the illumination produced on the screen 55 is violet in colour. Since the human eye is almost insensitive to such light, the adjustment of the camera unit is most easily performed from observations of the associated picture receiving unit referred to above.

Some of the light returned from the screen 55 will pass through the aperture 23 of the camera unit and reach the photo-electric cell 31. Light passing through the slot 58 illuminates the front cover plate 41 of the water level gauge 35, and some of the light returned by that plate will also reach the photo-electric cell 31. Light striking the front window 39 of the gauge will be absorbed within the box 47 if water lies behind the part of the window struck by the light, but will be reflected back by the mirror 49 through the slots 38, 43, 45 and 58 to the photo-electric cell 31 if steam lies behind the part of the window struck by the light.

It will be appreciated that at any instant only a small area of the object to be televised is illuminated by the spot of light from the cathode ray tube but that the signal voltage developed across the load resistance of the photo-electric cell 31 is proportional to the total illumination of the whole surface viewed by that cell.

Thus, if the photo-electric cell were not particularly responsive to light having a wave-length in the region of 4000 angstrom units (the wave-length for peak emission of light from the tube 15) and the object to be televised were also illuminated by a relatively powerful tungsten filament incandescent lamp, there would be only a very small percentage fluctuation in the signal voltage provided by the photo-electric cell 31 as the light beam provided by the cathode ray tube 15 scanned the object 21.

But since the light provided by a tungsten filament incandescent lamp has an energy distribution with a peak value in the region of a wave-length of 10,000 angstrom units and with a relatively low value in the region of a wave-length of 4,000 angstrom units, the photo-electric cell used substantially ignores the illumination of the object 21 by any adjacent tungsten filament lamp, and the percentage fluctuations in the signal voltage as the light beam provided by the cathode ray tube 15 scans the object 21 become sufficiently large to enable a good picture to be obtained on the associated picture receiving apparatus.

Figure 5 illustrates the variation with wave-length which occurs in the energy distribution in tungsten light at a filament temperature of 2775° K. and in the response of a photo-emissive substance which would be suitable for the photo cathode of the photo-electric cell 31.

It has been found that the use of the aluminium screen 55 with a matt surface finish helps materially in the reduction of so-called "noise," which results in the production of random flecks of light in the picture displayed by the associated picture receiving apparatus, and that a similar result alternatively may be obtained by the omission of the screen 55 accompanied by the use of a coat of matt-finish aluminium paint on the front cover plate and nuts of the water level gauge.

Most commercially available photo-sensitive electron-emissive substances which are suitable for photo-cathodes are much more sensitive to light of wave-lengths falling within some narrow range of wave-lengths specific to that substance than to light of other wave-lengths, and therefore most photo-cathodes which are reasonably sensitive to light having a wave-length of 4000 angstrom units will not be very sensitive to light of longer wave-lengths; but certain photo-cathode finishes, such as that known as "silver-oxygen-caesium." which have comparable sensitivities to lights of wave-lengths of 4000 and of 10,000 angstrom units, may be used in conjunction with an optical colour filter placed in front of the photo-electric cell 31 and of such colour as to cause considerable attenuation of light having a wave-length above say 5000 angstrom units. The light-sensitive cell 31 may therefore be replaced with a light-sensitive unit including a photo-electric cell having a response range which includes wave-lengths considerably above 4000 angstrom units and also includes an appropriate optical filter which severely attenuates or stops light having a wave-length substantially longer than 4000 angstrom units, say longer than 5000 angstrom units.

Since the photo-electric cell 31 described above is intended to be responsive to substantially monochromatic light only, it is not necessary that the optical lens systems for the scanning spot cathode ray tube and for the photo-electric cell should be free from chromatic errors, and therefore it is possible to use relatively cheap moulded lenses of plastic material instead of expensive ground compound lenses. The crossed cylindrical lenses 25 and 26 are preset relative to the photo-electric cell 31 before assembly of the camera unit so as to concentrate all the light which will enter from the predetermined scanned area of the object to be televised onto the active surface of the photo-cathode, which appears long and narrow as viewed through the window of the cell, and normally will have a different ratio of apparent width to height than the scanned area of the object.

Since the use of light having a wave-length in the region of 4000 angstrom units and of a light-sensitive unit having a peak response to such light enable the light-sensitive unit, for example the cell 31, to be mounted adjacent the scanner, the scanner may be arranged to scan the depths of a deep hole or depression in the object to be televised, and the light-sensitive unit so arranged as to receive light from the depths of that hole or depression. Furthermore, if a non-light-reflecting obstruction is movable transversely of the hole or depression to obstruct light passing therethrough, a mirror such as the mirror 49 may be positioned on the side of the obstruction remote from the scanner and arranged to reflect unobstructed light received from the scanner to the light-sensitive unit, thereby improving the picture of the obstruction which may be obtained. The obstruction may be a light-refractive liquid column as described in connection with the preferred embodiment illustrated, or it may be a column of light-absorbent liquid; it might alternatively be any other light-refractive or light-absorbent body, generically a material capable of changing the light velocity in a vector sense.

In the arrangement illustrated and described above, the use of light of a narrow spectral band in the region of 4000 angstrom units and generally within the range of 3000 to 5000 angstrom units, minimises the "noise" produced by ambient light such as that from incandescent electric lamps falling upon the objects being televised. The ill effects of such light are further lessened by the use of the hood 24 and of a lens system which restricts the field of view of the light-sensitive cell to that area scanned by the flying spot scanner, whilst further improvement is obtained by the use at the object of a surface such as a matt aluminium surface which absorbs a substantial proportion of light of wave-lengths other than that projected by the scanner. As a result, under normal conditions with not too bright day-light or with incandescent electric lighting, a good picture is obtained without enclosing the object and apparatus by a light-tight screen. Since the transmitting apparatus is constructed as a unit it is very convenient to use besides being compact and of neat appearance.

What I claim as new and desire to secure by Letters Patent of the United States is:

A boiler water level telegauge comprising, a translucent tube type water gage column adapted to be connected in communication with a steam boiler so that a column of water lies in the tube below a column of steam, the top level of the water column denoting the water level in the boiler, said gage column being of wedge shaped cross section whereby the water column refracts light projected thereto to a greater degree than the steam column; a light tight casing enclosing one side of said gage column and having an interior non-light reflecting surface for absorbing light refracted by said water column; a front face member attached to said casing enclosing the other side of said gage column and having an elongated slot aligned with said gage column for passing light thereto, said front face member having a non-light reflecting front surface; a television transmitter positioned on said other side of said gage column and comprising a flying spot scanner adapted to project a raster on said front surface of said face member and through said slot and said gage column; a reflector positioned in said casing to reflect back through said gage column only that portion of the raster passing through the steam column, the portion of the raster passing through the water column being refracted and absorbed by said interior non-light reflecting surface of said casing; and a light sensitive unit positioned on the same side of said gage column as said transmitter to be illuminated by that portion of the raster reflected back through said gage column by said reflector.

References Cited in the file of this patent

UNITED STATES PATENTS

| | | |
|---|---|---|
| 2,028,475 | Rockwell | Jan. 21, 1936 |
| 2,334,475 | Claudet | Nov. 16, 1943 |
| 2,561,197 | Goldsmith | July 17, 1951 |
| 2,573,006 | Good | Oct. 30, 1951 |
| 2,578,939 | Moran | Dec. 18, 1951 |
| 2,606,297 | Sweet | Aug. 5, 1952 |
| 2,645,971 | Herbst | July 21, 1953 |
| 2,761,009 | Sheldon | Aug. 28, 1956 |